F. G. HIRST.
CRATE.
APPLICATION FILED MAY 17, 1921.

1,437,181.  Patented Nov. 28, 1922.

Witness:
Walter Chism

Inventor:
Franklin G. Hirst.
by M. Van Voorkirk,
his Attorney.

Patented Nov. 28, 1922.

1,437,181

UNITED STATES PATENT OFFICE.

FRANKLIN G. HIRST, OF PHILADELPHIA, PENNSYLVANIA.

CRATE.

Application filed May 17, 1921. Serial No. 470,420.

*To all whom it may concern:*

Be it known that FRANKLIN G. HIRST, a citizen of the United States, residing at Philadelphia, in the county of Philadelphia and State of Pennsylvania, has invented certain new and useful Improvements in Crates, of which the following is a specification.

This invention relates to crates for packing and shipping vehicle bumpers and more particularly to the type of bumper adapted to be connected to automobiles.

It is the principal object of the present invention to provide a crate construction in which vehicle bumpers of the general type disclosed in Letters Patent No. 1,338,597 issued to Howard Taylor, April 27th, 1920 may be securely packed and shipped without injury to the bumper.

A further object of the invention is to provide a crate of the character stated which conforms to the shape of the bumper to be packed therein, avoiding extra bulk which adds to shipping charges, and one that is comparatively inexpensive to construct and one that is readily assembled.

A further object of the invention is to provide a crate of the character stated whereby the resiliency of the resilient bar of the bumper to be packed therein will act as a means of firmly maintaining said bumper in position therein.

For a full understanding of the invention reference is to be had to the following description and accompanying drawings, in which:—

Like letters of reference refer to like parts throughout the drawings.

Figure 1:
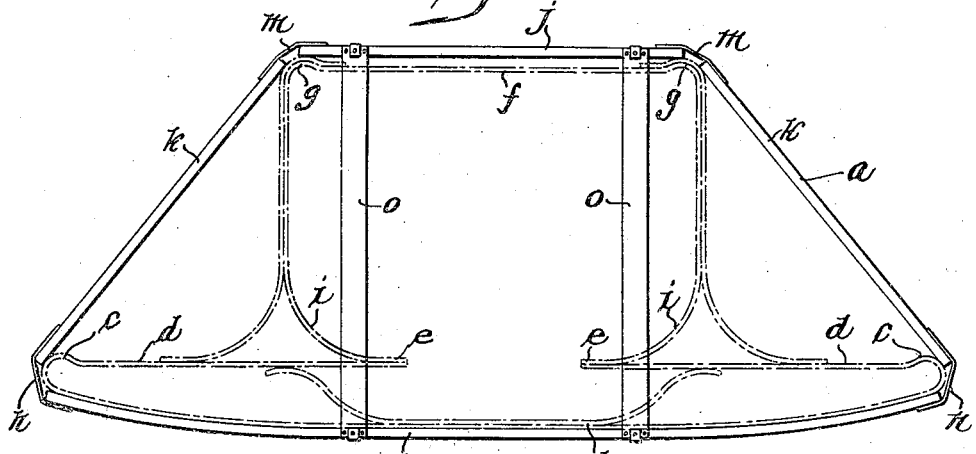
Figure 1 is a top plan view of the crate with a vehicle bumper packed therein, said bumper being shown in dotted lines.
Figure 2:
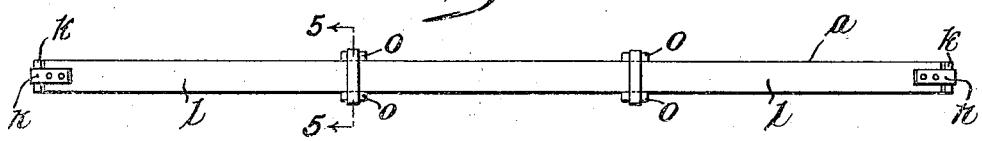
Figure 2 is a side elevational view thereof.
Figure 3:
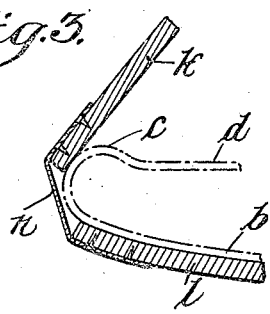
Figure 3 is a transverse sectional view of the means of connecting the members $l$ and $k$ at the turns $c$ of the bumper.
Figure 4:
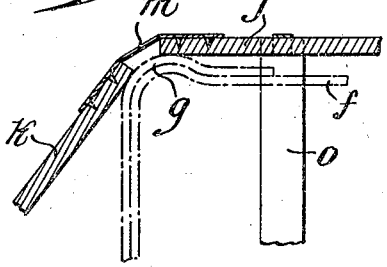
Figure 4 is likewise a transverse sectional view of the means of connecting the members $j$ and $k$ at the turns $g$ of the said bumper.
Figure 5:
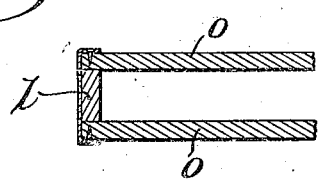
Figure 5 is a detail sectional view on line 5—5 of Fig. 2.

Referring to said drawings in detail the reference character $a$ denotes my improved crate as an entirety.

A conventional form of vehicle bumper is shown positioned in the said crate $a$ by dotted lines in Fig. 1 of the drawings.

This bumper comprises a main, front bumper member $b$ in the form of a resilient bar as in the nature of a flat spring of suitable length, which is bent at its ends $c$—$c$ and returned as at $d$—$d$ so as to form end sections $e$—$e$, which are adapted to be connected to a suitable supporting structure here indicated as comprising a U-shaped bracket $f$ bent, substantially, at right angles, at its outer ends $g$—$g$ and then extending forwardly and being curved as at $i$—$i$ behind the end sections $e$—$e$. The said bumper is further supported and braced in the conventional manner and as described in the Letters Patent to Taylor aforesaid.

The crate $a$ is formed of a top horizontal member $j$; side angular members $k$—$k$ extending from the bent portions $g$—$g$ of the bracket $f$ to the bent ends $c$—$c$ of the resilient bar $b$, and a horizontal bottom member $l$. The member $j$ is connected to the side angular members $k$—$k$ by means of the metal strips $m$ in any suitable manner, illustrated in the drawings, as nails. The horizontal bottom member $l$ is connected to the opposite ends of said members $k$—$k$ in a similar manner by means of like metal strips $n$.

The side angular members $k$—$k$ are first secured to the upper horizontal member $f$ at the turns $g$—$g$ of the bumper, then the member $l$ is connected at one end to the lower end of a member $k$ and is extended transversely along and under the resilient bar $b$, and the opposite end of said member $l$ is connected to the lower end of the opposite member $k$.

The member $l$ is pressed firmly against the resilient bar $b$ after it is connected to one end of a member $k$ before it is finally connected to the end of the opposite member $k$ so that when finally connected the resiliency of the bar $b$ will cause said bar to snap back firmly in position against the member $l$, holding the bumper firmly in position in said crate.

Duplicate vertical connecting braces $o$—$o$, on either side, connect the upper member $f$ and the lower member $l$ and prevent the forward and rearward displacement of said bumper from said crate.

Various minor modifications may be made to the invention without departing from the spirit thereof or the scope of the appended claim.

I claim:

The combination with a vehicle bumper provided with a front bumper member in the form of a resilient bar bent and returned at its ends to form end sections adapted to be connected to a U-shaped bracket bent at right angles at its outer ends and then extending forwardly and being curved behind the end sections of said resilient bar of a crate therefor, comprising a top horizontal member, side angular members, means to connect said horizontal and side angular members at the turns in said bracket, a bottom horizontal member adapted to be secured at the opposite ends of the side angular members at the turns in said resilient bar and extending transversely along and under said resilient bar, whereby said resilient bar acts as a means of retaining said bumper in position in said crate, substantially as described.

In testimony whereof I affix my signature.

FRANKLIN G. HIRST.